United States Patent
Hauschild et al.

(10) Patent No.: US 7,515,347 B2
(45) Date of Patent: Apr. 7, 2009

(54) DEVICE AND METHOD FOR VARYING AN ELECTROMAGNETIC RADIATION FIELD IN THE OPTICAL SPECTRAL REGION, PARTICULAR IN A LASER RADIATION FIELD

(75) Inventors: Dirk Hauschild, Köln (DE); Aleksei Mikhailov, Dortmund (DE)

(73) Assignee: Limo Patentverwaltung GmbH & Co. KG, Gerstengrund (DE)

( * ) Notice: Subject to any disclaimer, the term of this patent is extended or adjusted under 35 U.S.C. 154(b) by 74 days.

(21) Appl. No.: 11/825,082

(22) Filed: Jul. 2, 2007

(65) Prior Publication Data

US 2007/0297742 A1 Dec. 27, 2007

Related U.S. Application Data

(63) Continuation of application No. PCT/EP2004/014842, filed on Dec. 30, 2004.

(51) Int. Cl.
*G02B 3/00* (2006.01)
(52) U.S. Cl. ...................... 359/642; 359/654
(58) Field of Classification Search ................ 359/642, 359/652–654
See application file for complete search history.

(56) References Cited

U.S. PATENT DOCUMENTS

| 4,331,390 | A | 5/1982 | Shafer |
| 5,959,777 | A | 9/1999 | Whitehead |
| 2004/0177913 | A1 | 9/2004 | Chang et al. |
| 2004/0218868 | A1 | 11/2004 | Liu |
| 2008/0252845 | A1* | 10/2008 | Dreher et al. ........... 351/160 R |

OTHER PUBLICATIONS

Hugh Newell: "Techniques in cementing large lenses", XP-002344588, pp. 142-146, 2002.

* cited by examiner

*Primary Examiner*—Scott J Sugarman
*Assistant Examiner*—Dawayne A Pinkney
(74) *Attorney, Agent, or Firm*—Laurence A. Greenberg; Werner H. Stemer; Ralph E. Locher

(57) ABSTRACT

A device for altering an intensity distribution of a laser radiation field contains two substrates with differing refractive indices and with two opposed, mutually corresponding optical functional boundary surfaces, which are at least partly curved. The laser radiation field for altering can pass serially through the optical functional boundary surfaces, whereby a difference in the refractive indices of the first and second substrate is less than 0.1 and the cavity, between the first optical functional boundary surface and the second optical functional boundary surface is embodied such that the laser radiation, on propagation from the first substrate into the second substrate, is essentially subjected to one refraction on the basis of the difference in the refractive indices of the first and second substrate.

29 Claims, 2 Drawing Sheets

DEVICE AND METHOD FOR VARYING AN ELECTROMAGNETIC RADIATION FIELD IN THE OPTICAL SPECTRAL REGION, PARTICULAR IN A LASER RADIATION FIELD

CROSS-REFERENCE TO RELATED APPLICATION

This is a continuing application, under 35 U.S.C. § 120, of copending international application No. PCT/EP2004/014842, filed Dec. 30, 2004, which designated the United States; the prior application is herewith incorporated by reference in its entirety.

BACKGROUND OF THE INVENTION

Field of the Invention

The present invention relates to a device for varying an electromagnetic radiation field in the optical spectral region, in particular a laser radiation field. The present invention also relates to a method for producing such a device.

In the present case, an electromagnetic radiation field in the optical spectral region is intended to mean that the electromagnetic radiation can be refracted at optically functional boundary surfaces. In addition to applying to the visible region, this is also true for the near, middle and far infrared region, and the UV region as far as into the vacuum UV region.

When an electromagnetic radiation field in the optical spectral region, in particular when a laser radiation field is to be imaged or focused onto a working plane, it is mostly refractive elements that are used as lenses. The intensity distribution of the laser radiation field in the working plane is influenced in this case by the shape and condition of the lenses used. When, for example, a spherical lens for imaging or focusing the laser radiation onto the working plane is used, imaging errors arise owing to spherical aberration. On the other hand, in the case of spherical lenses it is possible for the surfaces to be polished comparatively well such that the quality of a spherical surface is comparatively good. When, however, aspheric lenses are used in order to avoid the above-named imaging errors, undesired irregularities are produced in the intensity distribution of the laser radiation in the working plane owing to the irregular surface of the aspheric lens.

FIG. 1 shows an example of a correction element 1, that can be used, for example, in addition to a spherical lens in order to correct imaging errors caused by the spherical lens. The correction element 1 depicted in FIG. 1 contains a substrate with a refractive index $n_2$ that is, for example, of the order of magnitude of approximately 1.5 in the case of glass. By contrast, the surrounding air has a refractive index of $n_1=1$. The correction element 1 depicted in FIG. 1 has an optically functional boundary surface 2 that exhibits two elevations and one depression in FIG. 1. The shape of the optically functional boundary surface can vary depending on whether the aim is only to correct imaging errors, or whether it is also intended to vary the shape of the intensity distribution of the laser radiation field in the working plane.

A depth $T_1$ of the structures on the optically functional boundary surface 2 of the correction element 1 can be 600 nm, for example. The typical imaging errors of a spherical lens can be corrected by use of such deep structures and a difference in refractive index $\Delta n=0.5$. However, in order to attain a uniformity of the intensity distribution in the working plane that is required for high power laser applications or for applications in chip production or the like, the surface roughness of the optically functional boundary surface 2 must lie in the range from at most 20 nm to 30 nm. Such a high quality surface either cannot be achieved at all in the case of aspheric surfaces with the aid of conventional production methods, or can be attained only using extremely cost-intensive methods that are based on the displacement and/or manipulating of individual atoms.

SUMMARY OF THE INVENTION

It is accordingly an object of the invention to provide a device and a method for varying an electromagnetic radiation field in the optical spectral region, particular in a laser radiation field which overcome the above-mentioned disadvantages of the prior art devices and methods of this general type, which provides a device of the type mentioned at the beginning that can be produced cost effectively and can contribute to generating a uniform and/or specifically varied intensity distribution of the radiation field in a working plane and/or to a specific variation in the wave front or phase front of the radiation field. It is further intended to specify a method with the aid of which such a device can be produced, wherein the aim, in particular, is to specifically influence the intensity distribution of the radiation field in the working plane and/or the wave front of the radiation field.

The device contains a first substrate with a first refractive index and a first optically functional boundary surface that is at least partially curved. The electromagnetic radiation field to be varied is able to pass at least partially through the first optically functional boundary surface. A second substrate with a second refractive index and a second optically functional boundary surface that is at least partially curved, is provided. The electromagnetic radiation field to be varied is able to pass at least partially through the second optically functional boundary surface after passing through the first optically functional boundary surface. A difference between the refractive indices of the first and the second substrates is smaller than the difference between each of the refractive indices of the first and the second substrates and the refractive index of air. The first and the second optically functional boundary surfaces are disposed on mutually facing sides of the first and the second substrates. The curvatures of the first and the second optically functional boundary surfaces correspond to one another at least in sections. The interspace between the first optically functional boundary surface and the second optically functional boundary surface is fashioned in such a way that when propagating from the first substrate into the second substrate through the first and the second optically functional boundary surfaces and the interspace located therebetween, the electromagnetic radiation field predominantly experiences a refraction on the basis of one or more differences in refractive index that are smaller than or equal to the difference between the refractive indices of the first and the second substrates.

Such a device can be used either for correcting an electromagnetic radiation field, or for shaping an electromagnetic radiation field, when a desired intensity profile is to be set in a working plane. By contrast with the correction element in accordance with FIG. 1 used, for example, in the prior art, the inventive device does not have a single optically functional boundary surface, but two optically functional boundary surfaces, comparatively closely neighboring, in two substrates separated from one another. However, these two substrates do not have so large a difference between refractive indices as that of approximately 0.5 between air and glass. In order, nevertheless, to achieve a similarly strong influence of the wave front of the radiation field, and/or to attain a similarly large correction of the intensity profile in the working plane, it is consequently necessary that the structures have a relatively large depth on the optically functional boundary surfaces. On the other hand, however, even in the case of a difference in refractive index that is, for example, smaller by a factor 5, the effect of surface roughnesses on the intensity distribution in the working plane will likewise be smaller by a factor 5, such that, given the same height requirements as described above in relation to the prior art, it is no longer necessary to achieve surface roughnesses of at most 20 nm to 30 nm, but only surface roughnesses in the range between 100 and 150 nm. This can be achieved using a substantially more advantageous production method. According to the invention, it need be ensured that when propagating from the first substrate into the second substrate through the first and the second optically functional boundary surfaces and the interspace located therebetween, the electromagnetic radiation field predominantly experiences a refraction on the basis of one or more comparatively small differences in refractive index.

In accordance with a preferred development of the invention, this can be attained by selecting a very small distance between the first and the second optically functional boundary surfaces. For example, it can be provided here that the first substrate and the second substrate are disposed in such a way that the distance between the first and the second optically functional boundary surface is smaller than the mean wavelength of the electromagnetic radiation field, at least in sections. In particular, it can be provided in accordance with claim that the first substrate and the second substrate are disposed in such a way that the distance between the first and the second optically functional boundary surface is smaller than 100 nm, at least in sections. It can preferably be provided that the first substrate and the second substrate are disposed in such a way that the distance between the first and the second optically functional boundary surfaces is smaller than 50 nm, at least in sections, in particular, is approximately between 10 and 20 nm.

It is achieved as a result of such small distances between the optically functional boundary surfaces that an electromagnetic wave propagating through the first substrate polarizes or influences the atoms, ions or molecules of the first substrate in the region of the first optionally functional boundary surface in such a way that this polarizing or influencing of the material in the vicinity of the first optically functional boundary surface also simultaneously polarizes or influences atoms, ions or molecules in the second substrate in the region of the second optically functional boundary surface such that an electromagnetic wave can propagate from this second optically functional boundary surface into the second substrate. The electromagnetic wave therefore engages comparatively directly from the first substrate into the second substrate, and experiences as far as possible a refraction on the basis of the difference in refractive index between the first and the second substrates. The difference between the refractive index of the first substrate and the refractive index of the air possibly located in the interspace between the first and second substrates is certainly larger than the difference between the refractive indices of the two substrates. Nevertheless, given the sufficiently small mutual distance between the two optically functional boundary surfaces, the transition of the electromagnetic wave from the first substrate into the second substrate is not influenced, or influenced only insubstantially, by the refractive index of the interspace, but is substantially influenced only by the difference between the refractive indices of the first substrate and the second substrate. A sufficiently small distance is present when the distance between the boundary surfaces is smaller than the wavelength, in particular when the distance is small as compared to the wavelength. For example, the refractive index of the medium of the interspace will exert only a very small effect on the transition of the electromagnetic wave from the first substrate into the second one when the distance is less than $\frac{1}{10}$ of the wavelength of the electromagnetic radiation. This could be provided in the case of UV lasers with wavelengths in the region of up to 250 nm at given distances of smaller than 25 nm.

In accordance with an additional or alternative embodiment of the invention, a substance that has a refractive index greater than 1 is disposed, at least in sections, in the interspace between the first optically functional boundary surface and second optically functional boundary surface. It can be provided that a substance that has a refractive index that differs by less than 0.1 from each of the refractive indices of the first and the second substrates is disposed in the interspace between the first optically functional boundary surface and second optically functional boundary surface. It can be provided here, in particular, that a substance that has a refractive index that is smaller than the larger of the two refractive indices of the first and the second substrates and is larger than the smaller of the two refractive indices of the first and the second substrates is disposed, at least in sections, in the interspace between the first optically functional boundary surface and second optically functional boundary surface. In accordance with a particular configuration, it can be provided here that an immersion oil is disposed, at least in sections, in the interspace between the first optically functional boundary surface and second optically functional boundary surface. The provision of an immersive substance between the two optically functional boundary surfaces can likewise prevent the electromagnetic radiation field not being refracted on transition from the first substrate into the second substrate on the basis of differences in refractive index that are greater than the difference between the refractive indices of the first and the second substrates. Thus, for example, it is possible to introduce into the interspace between the optically functional boundary surfaces an immersion oil that has a refractive index disposed between the refractive indices of the first and the second substrates.

It can be provided that the curvature of the first optically functional boundary surface corresponds to the curvature of the second optically functional boundary surface in such a way that the boundary surfaces can engage in one another in a comparatively matching fashion. The two optically functional boundary surfaces can approach one another very closely given curvatures that correspond exactly to one another.

In accordance with an advantageous refinement of the present invention, the difference between the refractive indices of the first and the second substrates can be smaller than 0.01, in particular smaller than 0.01, preferably be approximately 0.005. The effects of surface roughnesses on the quality of the intensity distribution in the working plane can be significantly diminished by such small differences in the refractive index. For example, a tolerance against surface roughnesses that is greater by a factor of 100 is attained in the event of a difference between the refractive indices in the region of 0.005 by contrast with a difference in refractive index of 0.5 in accordance with the prior art. For example, surface roughnesses of the order of magnitude of between 2 µm and 3 µm are then tolerable given appropriate requirements placed on the uniformity of the intensity profile. However, such surfaces can be produced very easily and cost effectively.

Consequently, it can then be provided that the depth of the structures that contribute to the curvature of the first optically functional boundary surface and/or of the second optically functional boundary surface is larger than 10 µm, preferably larger than 50 µm. However, structures that are so deep can likewise be produced easily and cost effectively with the aid of appropriate fabricating methods.

It can be provided that the first optically functional boundary surface and/or the second optically functional boundary surface exhibit, at least in sections, a rotationally symmetrical curvature with regard to the mean propagation direction of the radiation field to be varied.

Alternatively or in addition thereto, it can be provided that the first optically functional boundary surface and/or the second optically functional boundary surface exhibit a partially cylindrical curvature, at least in sections. In some circumstances, the surfaces of the optically functional boundary surface can be produced more easily by providing partially cylindrical curvatures, at least in sections.

Alternatively, or in addition, it can be provided that the first optically functional boundary surface and/or the second optically functional boundary surface exhibit an aspheric curvature, at least in sections. Spherical aberrations that arise from imaging or focusing into a working plane by spherical lenses can, for example, be corrected by the provision of aspheric curvatures.

The first and the second optically functional boundary surfaces can, in particular, be configured comparatively as desired in order to attain a desired intensity distribution in the working plane.

It can be provided that the first substrate and/or the second substrate contain positioning devices or measures that enable a comparatively matching positioning of the first optically functional boundary surface at the second optically functional boundary surface. It is, for example, possible in this case for the positioning devices to be configured as grooves and/or elongated elevations. The optically functional boundary surfaces can be positioned exactly one upon another by such positioning devices, in order to achieve as small a distance as possible between the optically functional boundary surfaces, and a positioning in the transverse direction relative to one another that is as exact as possible, so as to attain the desired influencing of the wave front of the electromagnetic radiation. It is possible that the first substrate and/or the second substrate on the side averted from the optically functional boundary surfaces is flat, at least in sections. Such flat surfaces of the substrate can be produced with a very slight surface roughness with the aid of simple measures, such that even these boundary surfaces through which the electromagnetic radiation must pass do not disadvantageously influence the intensity distribution to be attained in the working plane.

It is, furthermore, possible that the device contains a third substrate with a third refractive index and a third optically functional boundary surface that is at least partially curved. The electromagnetic radiation field to be varied is at least partially able to pass through the third optically functional boundary surface; and, furthermore, a fourth substrate with a fourth refractive index and a fourth optically functional boundary surface that is at least partially curved. The electromagnetic radiation field to be varied is able to pass at least partially through the fourth optically functional boundary surface after passing through the third optically functional boundary surface. The difference between the refractive indices of the third and the fourth substrates is smaller than the difference between each of the refractive indices of the third and the fourth substrates and the refractive index of air. The third and the fourth optically functional boundary surfaces are disposed on mutually facing sides of the third and the fourth substrates. The curvatures of the third and the fourth optically functional boundary surfaces correspond to one another at least in sections. An interspace between the third optically functional boundary surface and the fourth optically functional boundary surface is fashioned in such a way that when propagating from the third substrate into the fourth substrate through the third and the fourth optically functional boundary surfaces and the interspace located therebetween, the electromagnetic radiation field predominantly experiences a refraction on the basis of one or more differences in refractive index that based smaller than or equal to the difference between the refractive indices of the third and the fourth substrates.

Further variations can be effected at the wave front of the electromagnetic radiation by such third and fourth curved optically functional boundary surfaces. For example, it is possible that the first and the second optically functional boundary surfaces exhibit a cylindrical structure with cylinder axes in a first direction perpendicular to the propagation direction of the electromagnetic radiation, whereas the third and the fourth optically functional boundary surfaces exhibit a cylindrical structure with cylinder axes in a second direction perpendicular to the propagation direction of the electromagnetic radiation, which, furthermore, is also perpendicular to the first direction. In this way, the first and the second cylindrical boundary surfaces on one side, and the second and the third cylindrical boundary surfaces on the other side form cylindrical lenses that are crossed in relation to one another and can influence the electromagnetic radiation passing through them in two mutually perpendicular directions.

It can be provided that the third substrate and/or the fourth substrate contains a positioning device that enables a comparatively matching positioning of the third optically functional boundary surface at the fourth optically functional boundary surface. Furthermore, the positioning device can also be provided that enables the first and the second substrates to be positioned at the third and the fourth substrates such that the entire device can be assembled exactly by the positioning device.

It is possible that the device contains more than four substrates with more than four optically functional boundary surfaces that are disposed in a fashion similar to one another like the first and second or third and fourth. Thus, it is possible to build up an entire row of substrates one after another such that an entire row of optically functional boundary surfaces, respectively, operate in pairwise fashion and contribute to varying the intensity distribution of the electromagnetic radiation field, or to varying the wave front of the electromagnetic radiation.

Furthermore, in addition to the at least two substrates, the device contains at least one lens device that enables at least partial focusing of the electromagnetic radiation field onto a working plane.

It is possible here, for example, that at least one lens device exhibits a spherical curvature, at least in sections. In this case, the substrates with the optically functional boundary surfaces act as far as possible as correction elements for the lens device that is, for example, configured with a spherical surface and substantially effects the imaging or focusing of the electromagnetic radiation into the working plane.

In accordance with the method according to the invention, the intensity distribution of the electromagnetic radiation in the working plane is determined. The determined intensity distribution is compared with the desired intensity distribution. A shape of the first and the second optically functional boundary surfaces is calculated from the difference between the determined and desired intensity distributions in such a way that it is possible to obtain the desired intensity distribution in the working plane upon inserting a first and a second optically functional boundary surface with the calculated shapes into the beam path of the electromagnetic field. The first and the second optically functional boundary surfaces are produced in the calculated shape.

Finally, it is possible by such a method to produce a device that can be used to attain an intensity distribution of substantially any desired configuration in a working plane. For example, such an intensity distribution could be rectangular, so-called top hat distribution. It is also entirely possible to produce other intensity distributions such as, for example, a triangular intensity distribution or the like. In accordance with the method according to the invention, it is possible to select a desired intensity distribution to be created, and to compare it with the intensity distribution that is produced without inserting the first and the second optically functional boundary surfaces in the working pane. The shape of the first and the second optically functional boundary surfaces can be calculated on the basis of the difference between the desired and the determined intensity distributions, such that the desired intensity distribution can be attained in the working plane after the introduction of the first and the second optically functional boundary surfaces.

It can be provided that the calculation of the shape of the first and the second optically functional boundary surfaces is carried out with the stipulation of the refractive indices of the first and the second substrates. The refractive indices of the substrates can be selected according to the requirements placed on the quality of the intensity profile and in this case the difference between the refractive indices should then be smaller as a rule when the requirements placed on the quality of the intensity distribution in the working plane are relatively high.

Other features which are considered as characteristic for the invention are set forth in the appended claims.

Although the invention is illustrated and described herein as embodied in a device and a method for varying an electromagnetic radiation field in the optical spectral region, particular in a laser radiation field, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
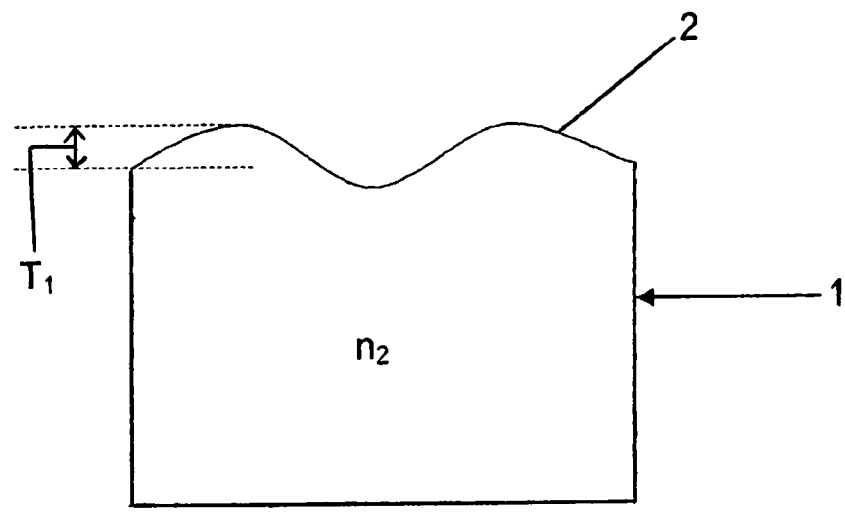
FIG. 1 is a diagrammatic view of an optical correction element in accordance with the prior art.
Figure 2:
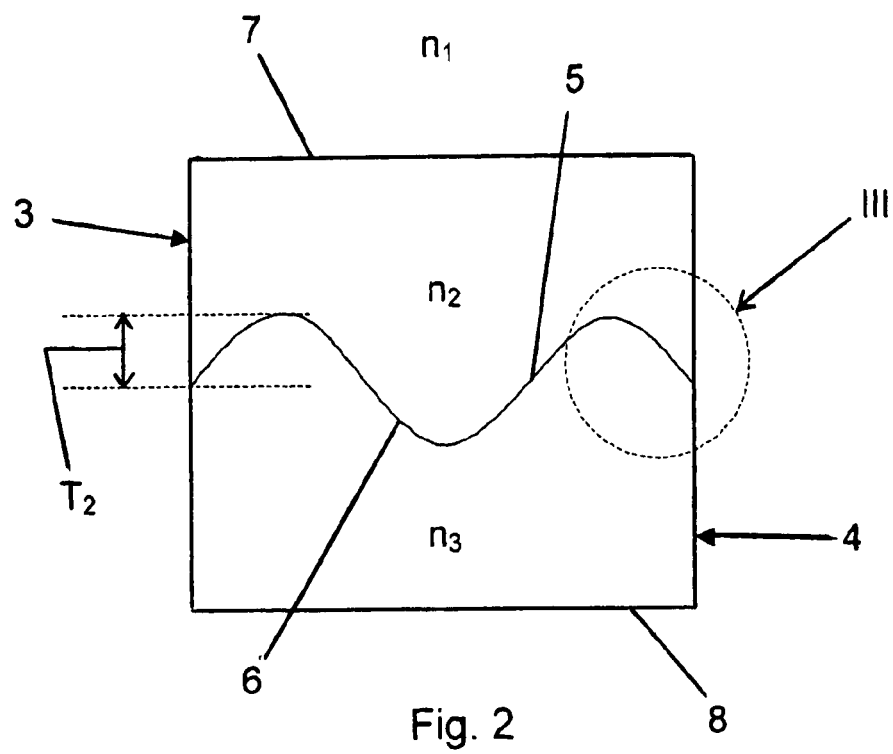
FIG. 2 is a diagrammatic, side view of a device according to the invention.

Referring now to the figures of the drawing in detail and first, particularly, to FIG. 2 thereof, there is shown an exemplary embodiment of a device according to the invention that contains a first substrate 3 with a first refractive index $n_2$, and a second substrate 4 with a second refractive index $n_3$. On its lower side in FIG. 2, the first substrate 3 has a first optically functional boundary surface 5. On its upper side in FIG. 2, the second substrate 4 has a second optically functional boundary surface 6. On their sides averted from the optically functional boundary surfaces 5, 6, the substrates 3, 4 have flat boundary surfaces 7, 8. The first substrate 3 and the second substrate 4 are surrounded, for example, by air that can have a refractive index of $n_1=1$.

The first optically functional boundary surface 5 and the second optically functional boundary surface 6 have curved structures whose depth $T_2$ can be comparatively large, for example can be more than 10 μm, in particular can be approximately 50 to 60 μm.

Figure 3:
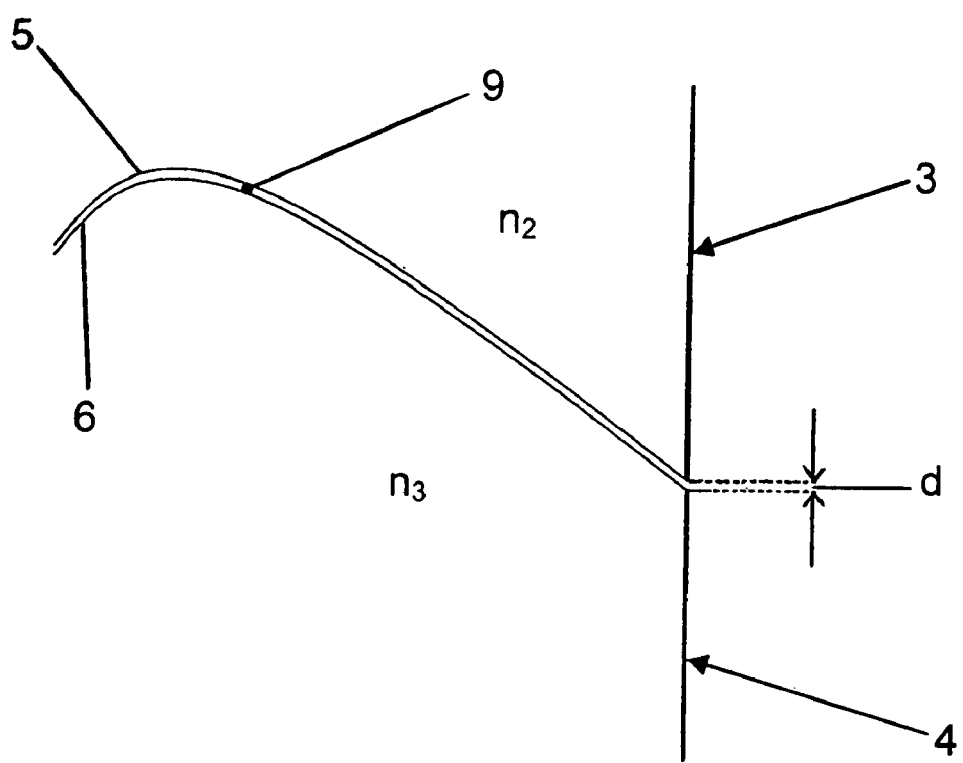
FIG. 3 is an enlarged, detailed view in accordance with the arrow III shown in FIG. 2.

It is clear in detail from FIG. 3 that the first optically functional boundary surface 5 and the second optically functional boundary surface 6 have substantially the same curvature or the same shape such that they run parallel to one another at least in sections. A distance d of the optically functional boundary surfaces 5, 6 from one another (see FIG. 3 in this regard) can be comparatively small, in particular can be approximately 10 nm to 20 nm.

It is possible for air with a refractive index $n_1=1$ to be provided in an interspace 9 between the first optically functional boundary surface 5 and the second optically functional boundary surface 6. However, as an alternative thereto, a substance with a refractive index greater than 1 can be provided in the interspace 9. In particular, an immersive substance, preferably an immersion oil, can be provided whose refractive index is in the region of the order of magnitude of $n_2$ and $n_3$.

There is, in particular, the possibility that the refractive index $n_2$ of the first substrate 3 is approximately 1.500, and that, furthermore, the refractive index n3 of the second substrate 4 is approximately 1.505 so that the difference Δn between the refractive indices of the substrates 3, 4 is approximately 0.005. The refractive index of the immersion oil can be 1.503, for example, in such a case.

It is possible that the surface curvatures of the first and the second optically functional boundary surfaces are of cylindrical configuration such that they extend into the plane of the drawing of FIG. 2 without variations. In such a case, it can be advantageous, in particular, when third and fourth functional boundary surfaces are provided that are disposed in a similar fashion as the first and second optically functional boundary surfaces, but have cylinder axes that are configured in a fashion perpendicular to those of the first and second optically functional boundary surfaces. This results in cylindrical lenses that are crossed relative to one another and can influence the electromagnetic radiation in two mutually perpendicular directions.

Electromagnetic radiation, for example in the form of laser radiation, can pass through the substrates 3, 4 shown in FIG. 2, for example from top to bottom in FIG. 2. A laser beam would thereby enter the upper (in FIG. 2) flat boundary surface 7 and emerge from the first substrate 3 through the first optically functional boundary surface 5. Furthermore, the laser beam emerging from the first optically functional boundary surface 5 would enter the second optically functional boundary surface 6 of the second substrate 4 and leave the latter through the lower flat boundary surface 8.

Particularly in the case of a very small distance d of, for example, 10 nm to 20 nm of the optically functional boundary surfaces 5, 6 from one another, upon the transition from the first substrate 3 into the second substrate 4, insubstantially the laser beam is not influenced, or is influenced only by the refractive index of the medium located in the interspace 9, but is influenced virtually exclusively by the difference in refractive index between the first substrate 3 and the second substrate 4. The reason for this is that, by comparison with the distance d, the electromagnetic wave really does have a comparatively large wavelength or extent such that the electromagnetic wave penetrates virtually without hindrance through the interspace 9. In the region of the first optically functional boundary surface 5, the electromagnetic field of the laser radiation effects a variation in the, for example dielectric, medium of the first substrate 3 that, in turn, effects as a direct consequence of the small distance d a variation in the, for example likewise dielectric, medium of the second substrate 4 in the region of the second optically functional boundary surface 6. This variation, effected in the region of the second optically functional boundary surface 6, in the, for example, dielectric medium for its part effects propagation of the electromagnetic wave downward in FIG. 3 in the second substrate 4.

Owing to the fact that the electromagnetic wave or the laser radiation to be varied therefore experiences only very small variations in refractive index in the region of the optically functional boundary surfaces 5, 6, the effects of any possible surface roughnesses on the desired intensity distribution in the working plane are comparatively slight. However, this means that comparatively large surface roughnesses of up to a few μm can be accepted. Such rough surfaces can, however, be produced very easily and cost effectively. In order, nevertheless, to be able to have appropriately large effects of the specifically crated curvatures of the optically functional boundary surfaces 5, 6 on the wave front or the intensity distribution in the working plane, the depth T2 of the structures of the curvatures of the optically functional boundary surfaces 5, 6 is selected to be appropriately large, for example in the region of 60 μm, as already described.

The invention claimed is:

1. A device for varying an electromagnetic radiation field in an optical spectral region, the device comprising:
    a first substrate with a first refractive index and a first optically functional boundary surface being at least partially curved, the electromagnetic radiation field to be varied being able to pass at least partially through said first optically functional boundary surface;
    a second substrate with a second refractive index and a second optically functional boundary surface being at least partially curved, the electromagnetic radiation field to be varied being able to pass at least partially through said second optically functional boundary surface after passing through said first optically functional boundary surface;
    a difference between said first and said second refractive indices of said first and said second substrates is smaller than a difference between each of said first and second refractive indices and a refractive index of air;
    said first and said second optically functional boundary surfaces being disposed on mutually facing sides of said first and said second substrates,
    said first and said second optically functional boundary surfaces having curvatures corresponding to one another at least in sections; and
    said first optically functional boundary surface and said second optically functional boundary surface defining therebetween an interspace fashioned such that when propagating from said first substrate into said second substrate through said first and said second optically functional boundary surfaces and said interspace located therebetween, the electromagnetic radiation field predominantly experiences a refraction on a basis of at least one difference in refractive index that are smaller than or equal to the difference between said first and said second refractive indices of said first and said second substrates.

2. The device according to claim 1, wherein said first substrate and said second substrate are disposed such that a distance between said first and said second optically functional boundary surfaces is smaller than a mean wavelength of the electromagnetic radiation field, at least in sections.

3. The device according to claim 1, wherein said first substrate and said second substrate are disposed such that a distance between said first and said second optically functional boundary surfaces is smaller than 100 nm, at least in sections.

4. The device according to claim 1, wherein said first substrate and said second substrate are disposed such that a distance between said first and said second optically functional boundary surfaces is smaller than 50 nm, at least in sections.

5. The device according to claim 1, wherein said first substrate and said second substrate are disposed such that a distance between said first and said second optically functional boundary surfaces is between 10 nm and 20 nm, at least in sections.

6. The device according to claim 1, further comprising a substance having a refractive index great than 1 disposed, at least in sections, in said interspace between said first optically functional boundary surface and said second optically functional boundary surface.

7. The device according to claim 1, further comprising a substance, having a refractive index that differs by less than 0.1 from each of said first and second refractive indices of said first and said second substrates, disposed in said interspace between said first optically functional boundary surface and said second optically functional boundary surface.

8. The device according to claim 1, further comprising a substance having a refractive index that is smaller than a larger of said first and second refractive indices of said first and said second substrates and is larger than a smaller of said first and second refractive indices of said first and said second substrates disposed, at least in sections, in said interspace between said first optically functional boundary surface and said second optically functional boundary surface.

9. The device according to claim 1, further comprising an immersion oil disposed, at least in sections, in said interspace between said first optically functional boundary surface and said second optically functional boundary surface.

10. The device according to claim 1, wherein said curvature of said first optically functional boundary surface corresponds to said curvature of said second optically functional boundary surface such that said first and said second functional boundary surfaces can engage in one another in a comparatively matching fashion.

11. The device according to claim 1, wherein said difference between said first and said second refractive indices of said first and said second substrates is smaller than 0.1.

12. The device according to claim 1, wherein said difference between said first and said second refractive indices of said first and said second substrates is smaller than 0.01.

13. The device according to claim 1, wherein said difference between said first and said second refractive indices of said first and said second substrates is approximately 0.005.

14. The device according to claim 1, wherein a depth of structures that contribute to said curvature of at least one of sad first optically functional boundary surface and said second optically functional boundary surface is larger than 10 µm.

15. The device according to claim 1, wherein a depth of structures that contribute to said curvature of at least one of said first optically functional boundary surface and said second optically functional boundary surface is larger than 50 µm.

16. The device according to claim 1, wherein at least one of said first optically functional boundary surface and said second optically functional boundary surface exhibit, at least in sections, a rotationally symmetrical curvature with regard to a mean propagation direction of the electromagnetic radiation field to be varied.

17. The device according to claim 1, wherein at least one of said first optically functional boundary surface and said second optically functional boundary surface exhibit a partially cylindrical curvature, at least in sections.

18. The device according to claim 1, wherein at least one of said first optically functional boundary surface and said second optically functional boundary surface exhibit an aspheric curvature, at least in sections.

19. The device according to claim 1, wherein at least one of said first substrate and said second substrate contains positioning means that enable a comparatively matching positioning of said first optically functional boundary surface at said second optically functional boundary surface.

20. The device according to claim 19, wherein said positioning means include at least one member selected from the group consisting of grooves and elongated elevations.

21. The device according to claim 1, wherein at least one of said first substrate and said second substrate on a side averted from said first and second optically functional boundary surfaces is flat, at least in sections.

22. The device according to claim 1, further comprising:
a third substrate with a third refractive index and a third optically functional boundary surface being at least partially curved, the electromagnetic radiation field to be varied being at least partially able to pass through said third optically functional boundary surface;
a fourth substrate with a fourth refractive index and a fourth optically functional boundary surface being at least partially curved, the electromagnetic radiation field to be varied being able to pass at least partially through said fourth optically functional boundary surface after passing through the third optically functional boundary surface;
a difference between said third and said fourth refractive indices of said third and said fourth substrates is smaller than a difference between each of said third and fourth refractive indices of said third and fourth substrates and the refractive index of air;
said third and fourth optically functional boundary surfaces are disposed on mutually facing sides of the third and the fourth substrates,
said third and fourth optically functional boundary surfaces having curvatures corresponding to one another at least in sections;
said third optically functional boundary surface and said fourth optically functional boundary surface defining a further interspace therebetween fashioned such that when propagating from said third substrate into said fourth substrate through said third and fourth optically functional boundary surfaces and said further interspace located therebetween, the electromagnetic radiation field predominantly experiences a refraction on a basis of at least one difference in refractive index that are smaller than or equal to the difference between said third and fourth refractive indices of said third and said fourth substrates.

23. The device according to claim 22, wherein at least one of said third substrate and said fourth substrate contain positioning means that enable a comparatively matching positioning of said third optically functional boundary surface at said fourth optically functional boundary surface.

24. The device according to claim 22, further comprising additional substrates with additional optically functional boundary surfaces disposed in a fashion similar to one another like said first and said second substrates or said third and said fourth substrates.

25. The device according to claim 1, further comprising at least one lens means for enabling at least partial focusing of the electromagnetic radiation field onto a working plane.

26. The device according to claim 25, wherein said at least one lens means exhibits a spherical curvature, at least in sections.

27. The device according to claim 1, wherein the electromagnetic radiation field in the optical spectral region is a laser radiation field.

28. A method for producing the device for varying the electromagnetic radiation field in the optical spectral region according to claim 1, which comprises the steps of:
determining an intensity distribution of electromagnetic radiation in a working plane resulting in a determined intensity distribution;
comparing the determined intensity distribution with a desired intensity distribution;
calculating a shape of the first and the second optically functional boundary surfaces from a difference between the determined intensity distribution and the desired intensity distribution such that it is possible to obtain the desired intensity distribution in the working plane upon inserting the first and the second optically functional boundary surface with the calculated shapes into a beam path of the electromagnetic radiation field; and
producing the first and the second optically functional boundary surfaces in the calculated shape.

29. The method according to claim 28, which further comprises carrying out the calculation of the shape of the first and the second optically functional boundary surfaces with a stipulation of the first and second refractive indices of the first and the second substrates.

* * * * *